US010683968B2

(12) United States Patent
Moon et al.

(10) Patent No.: US 10,683,968 B2
(45) Date of Patent: *Jun. 16, 2020

(54) PRESSURE SEWER CONTROL SYSTEM AND METHOD

(71) Applicant: South East Water Corporation, Frankston, Victoria (AU)

(72) Inventors: Rodney Leonard Moon, Langwarrin (AU); Martin Alexander Sutherland, Bulleen (AU); Andrew Forster-Knight, Oak Park (AU)

(73) Assignee: South East Water Corporation, Victoria (AU)

( * ) Notice: Subject to any disclaimer, the term of this patent is extended or adjusted under 35 U.S.C. 154(b) by 130 days.

This patent is subject to a terminal disclaimer.

(21) Appl. No.: 15/838,319

(22) Filed: Dec. 11, 2017

(65) Prior Publication Data

US 2018/0100623 A1 Apr. 12, 2018

Related U.S. Application Data

(63) Continuation of application No. 13/676,177, filed on Nov. 14, 2012, now Pat. No. 9,869,430, which is a
(Continued)

(30) Foreign Application Priority Data

Mar. 14, 2012 (AU) .................................. 2012901005

(51) Int. Cl.
*F17D 3/00* (2006.01)
*H04W 4/30* (2018.01)
(Continued)

(52) U.S. Cl.
CPC .............. *F17D 3/00* (2013.01); *F04B 49/065* (2013.01); *F04D 15/0218* (2013.01); *G05D 9/12* (2013.01);
(Continued)

(58) Field of Classification Search
CPC ........... F17D 3/00; H04W 4/30; H04W 12/06; H04W 4/80; F04B 49/065; G05D 9/12; F04D 15/0218
See application file for complete search history.

(56) References Cited

U.S. PATENT DOCUMENTS 6,378,554 B1 4/2002 Struthers et al.
6,395,181 B1 5/2002 Mullerheim et al.
(Continued)

FOREIGN PATENT DOCUMENTS

AU 2014100179 4/2014
CN 1473075 2/2004
(Continued)

OTHER PUBLICATIONS

*U.S. Appl. No. 13/676,177, Final Office Action, dated Feb. 19, 2016, 12 pages.
(Continued)

*Primary Examiner* — Charles R Kasenge
(74) *Attorney, Agent, or Firm* — Kilpatrick Townsend & Stockton LLP

(57) ABSTRACT

Embodiments relate generally to a pump control system for a pressure sewer installation. The system comprises a controller arranged to control supply of power to a pump of the pressure sewer installation. The controller is arranged to receive an output signal from a sensor in a fluid reservoir of the pressure sewer installation, the output signal being indicative of a measured fluid level in the fluid reservoir. A memory is accessible to the controller and is arranged to store operation information pertaining to operation of the pressure sewer installation. A wireless transceiver is in communication with the controller to allow the controller to communicate with a remote server over a communications network.

28 Claims, 9 Drawing Sheets

Related U.S. Application Data continuation of application No. PCT/AU2012/000903, filed on Jul. 31, 2012.

(51) Int. Cl.
*F04B 49/06* (2006.01)
*G05D 9/12* (2006.01)
*F04D 15/02* (2006.01)
*H04W 12/06* (2009.01)
*H04W 4/80* (2018.01)

(52) U.S. Cl.
CPC ............... *H04W 4/30* (2018.02); *H04W 4/80* (2018.02); *H04W 12/06* (2013.01)

(56) References Cited

U.S. PATENT DOCUMENTS

| | | | |
|---|---|---|---|
| 6,491,060 | B2 | 12/2002 | Struthers et al. |
| 6,595,051 | B1 | 7/2003 | Chandler et al. |
| 6,638,023 | B2 | 10/2003 | Scott et al. |
| 7,014,777 | B2 | 3/2006 | Ishikawa et al. |
| 7,072,945 | B1 | 7/2006 | Nieminen et al. |
| 7,289,923 | B2 | 10/2007 | Marovitz et al. |
| 7,342,506 | B2 | 3/2008 | Paoli et al. |
| 7,799,215 | B2 | 9/2010 | Matheis et al. |
| 8,594,851 | B1 | 11/2013 | Smaidris et al. |
| 8,600,568 | B2 | 12/2013 | Smaidris et al. |
| 8,983,667 | B2 | 3/2015 | Smaidris et al. |
| 9,869,430 | B2 * | 1/2018 | Moon ............... G05D 9/12 |
| 2003/0075502 | A1 | 4/2003 | Mullerheim et al. |
| 2005/0072469 | A1 | 4/2005 | Preul |
| 2006/0078435 | A1 | 4/2006 | Burza et al. |
| 2006/0267756 | A1 | 11/2006 | Kates |
| 2007/0103324 | A1 | 5/2007 | Kosuge et al. |
| 2008/0290011 | A1 | 11/2008 | Capano et al. |
| 2009/0081050 | A1 | 3/2009 | Moore et al. |
| 2009/0082977 | A1 | 3/2009 | Parkinson et al. |
| 2009/0187382 | A1 * | 7/2009 | Conroy ............ G05B 23/0267 702/188 |
| 2010/0156632 | A1 | 6/2010 | Hyland et al. |
| 2010/0268389 | A1 | 10/2010 | Wurm et al. |
| 2011/0068060 | A1 | 3/2011 | Hatten et al. |
| 2011/0120561 | A1 | 5/2011 | Quigley et al. |
| 2011/0168609 | A1 | 7/2011 | McQuade et al. |
| 2011/0240535 | A1 | 10/2011 | Pehrson et al. |
| 2011/0304475 | A1 | 12/2011 | Higgins et al. |
| 2011/0307106 | A1 | 12/2011 | Dutt et al. |
| 2012/0029709 | A1 | 2/2012 | Safreno |
| 2012/0194502 | A1 | 8/2012 | Smith et al. |
| 2012/0222994 | A1 * | 9/2012 | Smaidris ............... C02F 1/008 210/97 |
| 2013/0243614 | A1 | 9/2013 | Moon et al. |
| 2013/0307701 | A1 | 11/2013 | Forster-Knight |
| 2015/0227142 | A1 | 8/2015 | Hutchings |
| 2017/0227391 | A1 | 8/2017 | Forster-Knight et al. |

FOREIGN PATENT DOCUMENTS

| | | |
|---|---|---|
| CN | 101021725 | 8/2007 |
| CN | 101042587 | 9/2007 |
| CN | 201258267 | 6/2009 |
| CN | 201496242 | 6/2010 |
| CN | 101800766 | 8/2010 |
| JP | 2010203964 | 9/2010 |
| JP | 2014139373 | 7/2014 |
| NZ | 589998 | 10/2011 |
| WO | 2006060296 | 6/2006 |
| WO | 2011017104 | 2/2011 |
| WO | 2011110792 | 9/2011 |
| WO | 2013149281 | 10/2013 |

OTHER PUBLICATIONS

*U.S. Appl. No. 13/676,177, Final Office Action, dated May 15, 2017, 14 pages.
*U.S. Appl. No. 13/676,177, Non-Final Office Action, dated Sep. 2, 2016, 10 pages.
*U.S. Appl. No. 13/676,177, Non-Final Office Action, dated Sep. 8, 2015, 9 pages.
*U.S. Appl. No. 13/676,177, Notice of Allowance, dated Sep. 6, 2017, 9 pages.
*U.S. Appl. No. 13/676,177, Supplemental Notice of Allowance, dated Sep. 25, 2017, 2 pages.
U.S. Appl. No. 14/597,387 , "Non-Final Office Action", dated Jun. 30, 2017, 16 pages.
Australian Patent Application No. 2013903464, International Type Search Report, dated Jan. 20, 2014, 15 pages.
Cheng et al., "Flood Control Management System for Reservoirs", Environmental Modelling & Software, No. 19, 2004, pp. 1141-1150.
Chinese Patent Application No. 201280071396.8, Office Action, dated Jun. 1, 2016.
European Patent Application No. 12865548, Supplementary European Search Report, dated Jul. 14, 2014.
International Search Report, PCT Application No. PCT/AU2012/000903, dated Oct. 17, 2012.
New Zealand Patent Application No. 615470, First Exam Report, dated Jan. 15, 2015.
New Zealand Patent Application No. 703230, First Exam Report, dated Jan. 15, 2015.
PCT Patent Application No. PCT/AU2012/000903, Written Opinion, dated Oct. 17, 2012.
PCT Patent Application No. PCT/AU2014/000887, International Search Report, dated Oct. 21, 2014.
PCT Patent Application No. PCT/ AU2014/000887, Written Opinion, dated Oct. 21, 2014.
PCT Patent Application No. PCT/AU2015/050519, International Search Report, dated Nov. 13, 2015.
PCT Patent Application No. PCT/ AU2015/050519, Written Opinion, dated Nov. 13, 2015.

* cited by examiner

FIGURE 7

PRESSURE SEWER CONTROL SYSTEM AND METHOD

CROSS-REFERENCE TO RELATED APPLICATIONS

This application is a continuation of U.S. application Ser. No. 13/676,177, filed Nov. 14, 2012, which is a continuation of PCT/AU2012/000903, filed 31 Jul. 2012, which claims the benefit of priority from Australian patent application no. 2012901005, filed 14 Mar. 2012.

TECHNICAL FIELD

Described embodiments generally relate to pressure sewer systems and the monitoring and control of such systems for components, such as pumps, in such systems. Some embodiments specifically relate to pump control systems for pressure sewer installations, while other embodiments relate to systems for monitoring a network of pressure sewer installations including such pump control systems. Further embodiments relate to pressure sewer installations or kits therefor that include the pump control systems.

BACKGROUND

Pressure sewer systems involve the use of a fluid reservoir, such as a tank, buried in the ground to receive sewerage from a dwelling or building. Such pressure sewer systems rely on a pump within the fluid reservoir to pump fluid out of the reservoir and into a reticulated sewer system comprising fluid conduits to transport the sewerage to a suitable processing station. Such pressure sewer systems are generally installed in locations where gravity cannot be adequately relied on as the impetus for transporting the waste fluid within the sewer network.

The pressure sewer systems rely on proper functioning of the pump in combination with a float switch to avoid the fluid reservoir becoming too full and overflowing. Where the pump does not operate properly to evacuate the waste fluid from the fluid reservoir, this can lead to an undesirable overflow and/or leakage of sewerage from the fluid reservoir. This overflow can be a very unpleasant experience for the inhabitants of the dwelling and such inhabitants will commonly contact the organisation responsible for maintenance of the sewer system in order to rectify the problem. In such situations, because the organisation responsible for maintenance of the sewerage system learns about the malfunction from the complainants, there can be a delay before appropriate personnel can be dispatched to address the problem and before an appropriate solution is implemented. Not only do such situations result in significant dissatisfaction on the part of the inhabitants that the pressure sewer system is intended to serve, the leakage of the system presents possible public health and safety issues and reflects badly on the organisation responsible for the system's maintenance and proper function.

It is desired to address or ameliorate one or more shortcomings of prior pressure sewer systems, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a pump control system for a pressure sewer installation, the system comprising:
- a controller arranged to control supply of power to a pump of the pressure sewer installation, wherein the controller is arranged to receive an output signal from a sensor in a fluid reservoir of the pressure sewer installation, the output signal being indicative of a measured fluid level in the fluid reservoir;
- a memory accessible to the controller and arranged to store operation information pertaining to operation of the pressure sewer installation; and
- a wireless transceiver in communication with the controller to allow the controller to communicate with a remote server over a communications network.

The controller may be configured to control and monitor operation of the pressure sewer installation and to send stored operation information to the remote server. The operation information may include measured fluid level information.

The controller may be configured to compare the fluid level to a fluid level threshold stored in the memory of the controller and to cause the pump to operate to pump fluid out of the fluid reservoir when the fluid level is greater than or equal to the fluid level threshold.

The controller may be responsive to a command received from the remote server to store a changed fluid level threshold in the memory.

The wireless transceiver may be configured to communicate with the remote server using a mobile telephony standard protocol. The controller may be configured to be controllable remotely by commands received from the remote server.

The system may further comprise one or more additional devices and one or more additional wireless or wired transceivers or receivers in communication with the controller, to allow the controller to communicate with or receive information from the one or more additional devices. The one or more additional devices may be flow meters or other instruments for the monitoring of a sewerage or water supply network.

The system may be mains powered and may comprise a backup power supply to power the controller and the wireless transceiver in the absence of adequate mains power.

The controller may be further configured to receive a float switch output signal from a float switch in the fluid reservoir indicative of a high fluid level, the controller being configured to operate the pump in response to the fluid switch output signal.

Some embodiments relate to a pressure sewer network monitoring system, comprising:
- a plurality of the described pump control systems; and
- the remote server in communication with the wireless transceiver of each of the pump control systems;
- wherein the remote server is configured to monitor operation of each pressure sewer installation based on messages received from each pump control system and to affect operation of each pump control system by transmission of one or more commands from the remote server to each pump control system.

The system may further comprise a computerised user interface in communication with the remote server to allow remote user control of each pump control system.

The system remote server may be configured to determine an alarm condition based on the messages received and to automatically transmit one or more alarm messages to one or more user recipients, the one or more alarm messages including an indication of the alarm condition.

Some embodiments relate to a pressure sewer installation, comprising the described pump control system and further comprising the pump, the sensor and the fluid reservoir.

Some embodiments relate to a kit for a pressure sewer installation, the kit comprising the described pump control system and further comprising the pump, the sensor and the fluid reservoir.

BRIEF DESCRIPTION OF THE DRAWINGS

Embodiments are described in further detail below, by way of example, with reference to the accompanying drawings, in which:

FIG. 7 is a further example user interface display generated by interface components of the pressure sewer network monitoring system;

DETAILED DESCRIPTION

Described embodiments generally relate to pressure sewer systems and the monitoring and control of such systems or components, such as pumps, in such systems. Some embodiments specifically relate to pump control systems for pressure sewer installations, while other embodiments relate to systems for monitoring a network of pressure sewer installations containing described pump control systems. Further embodiments relate to pressure sewer installations or kits therefor that include the pump control systems.

Figure 1:
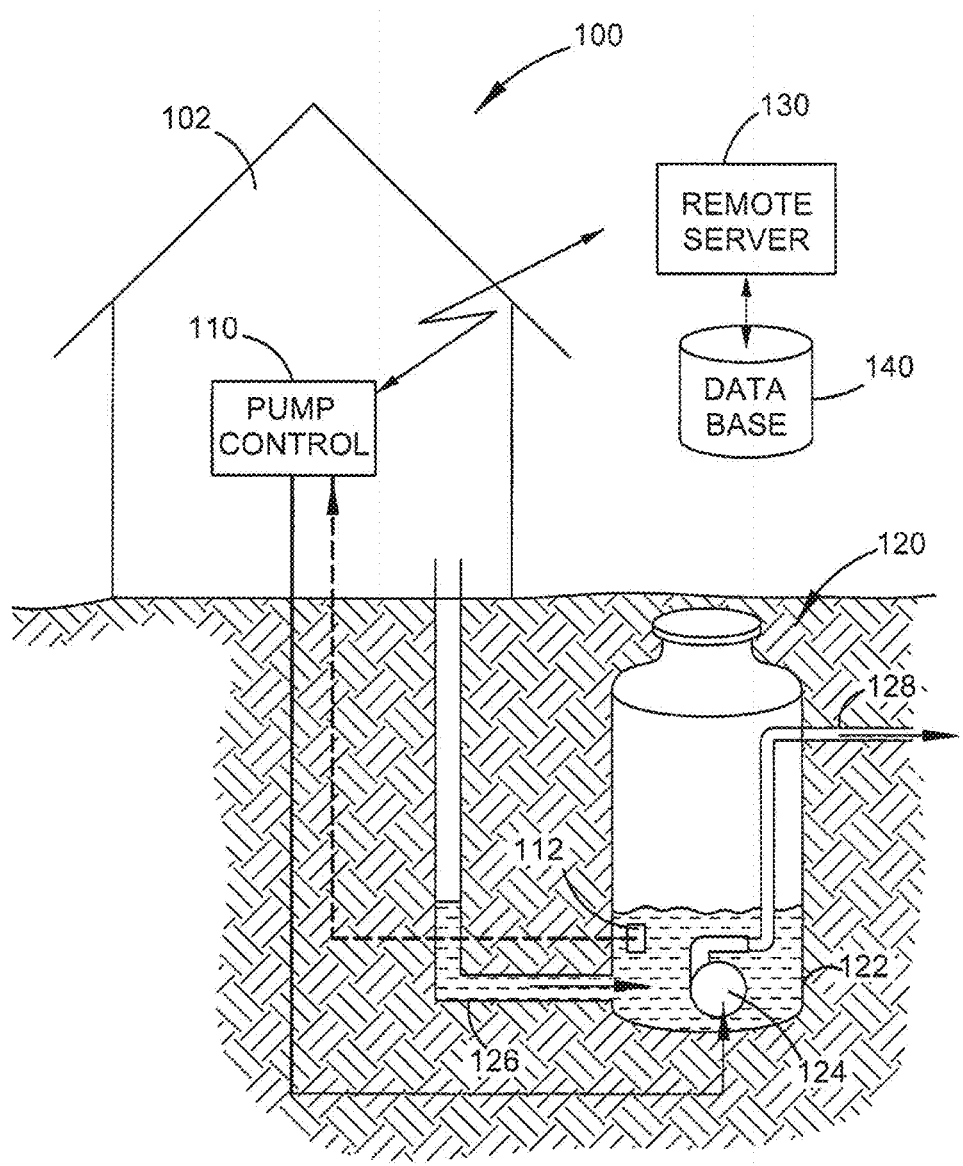
FIG. 1 is a schematic representation of a pressure sewer installation having a pump control system according to some embodiments.
Figure 2:
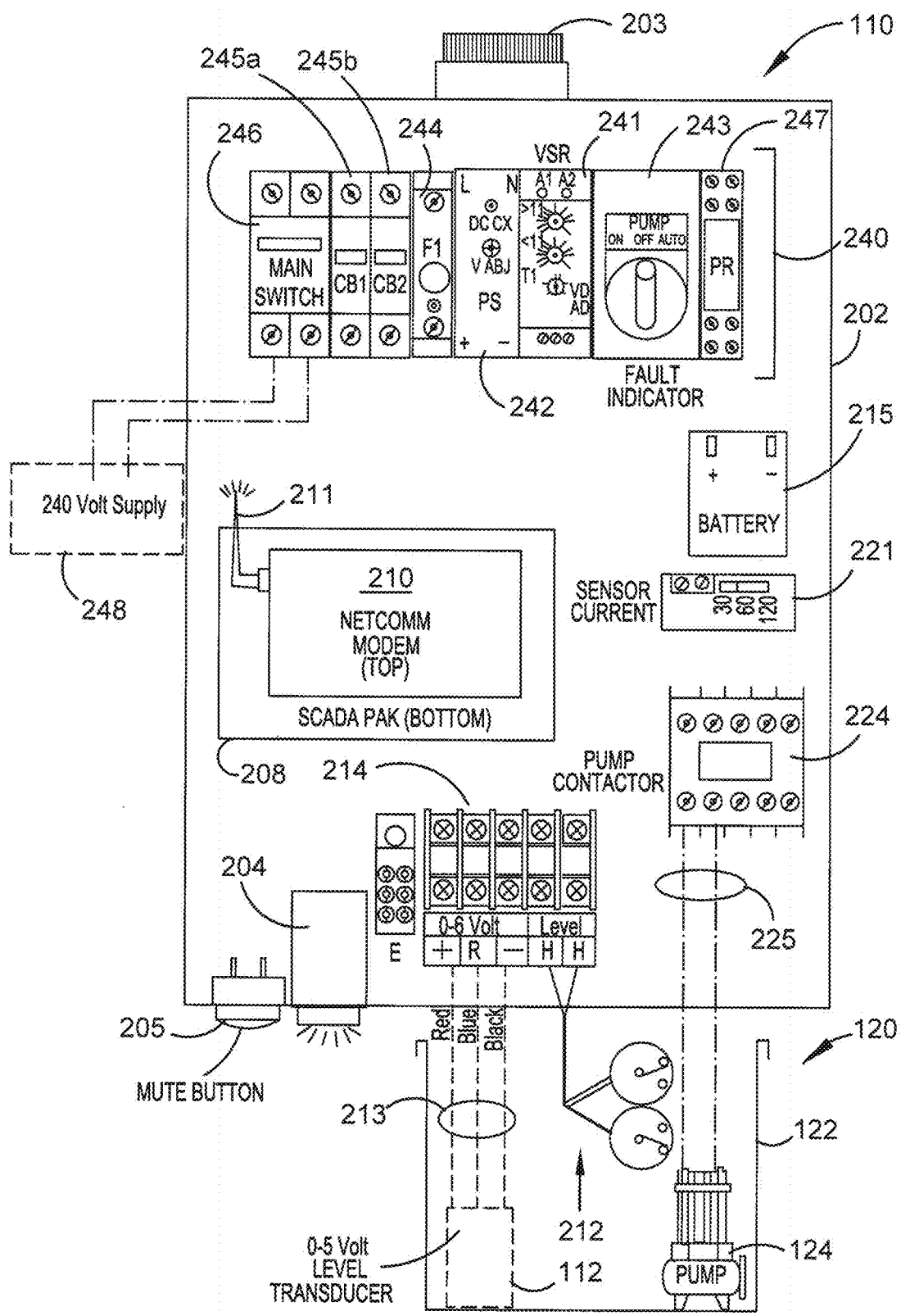
FIG. 2 is a schematic diagram of the pump control system.
Figure 3:
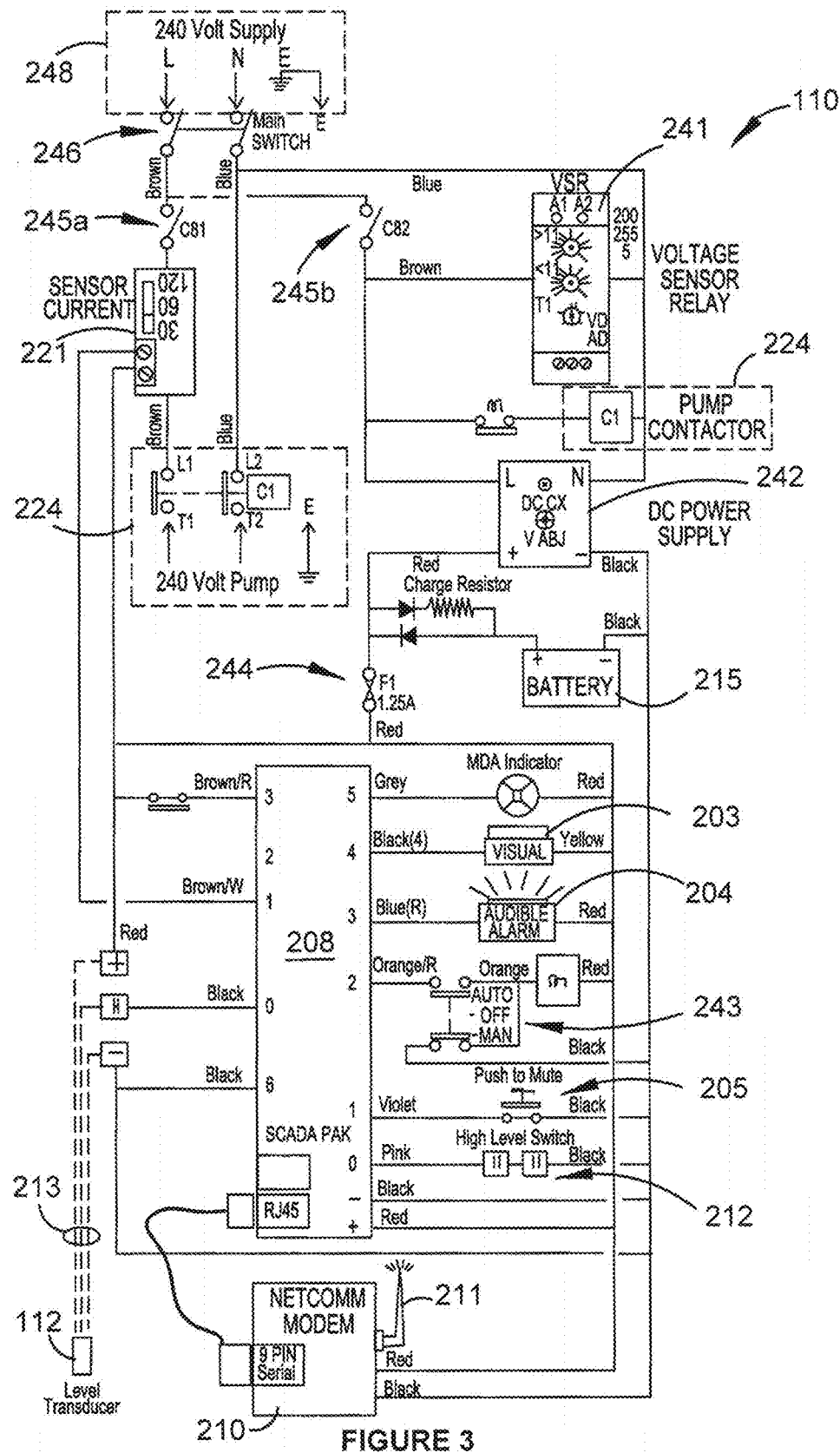
FIG. 3 is an electrical circuit schematic diagram of the pump control system.

Referring in particular to FIGS. 1, 2 and 3, there is shown a pressure sewer installation 100 comprising a pump control system 110 operating in cooperation with a buried sewerage tank 120. The pump control system 110 constitutes the above-ground part of installation 100 while the sewerage tank 120 constitutes the in-ground part. The sewerage tank 120 has a fluid reservoir 122 that is arranged to receive waste water from a domicile or other building 102 via an inlet conduit 126. The fluid reservoir 122 houses a pump 124 therein, with the pump 124 being arranged to pump fluid out of the reservoir 122 via a fluid outlet conduit 128 into a reticulated sewerage network of fluid conduits.

The in-ground components of installation 100 also include a level sensor 112 and a float switch 212. The level sensor 112 may be a pressure transducer, for example, and is in electrical communication with the pump control system 110 via suitable means, such as an electrical cable. The pump 124 operates under the control of pump control system 110, only turning on and off in response to the action of a suitable pump contactor (relay) 224 that supplies mains power to the pump 124 from a mains power supply 248.

The level sensor 112 may be arranged to have the sensing head generally submerged below the fluid level in order to obtain a constant accurate measure of the fluid level within the fluid reservoir 122 and provide a constant (or sufficiently regular as to be effectively constant) output signal to the pump control system 110. Float switch 212 is provided as a high level fail safe, so that when the fluid level in the reservoir 122 gets above the shut-off level of the float switch 212, the float switch 212 provides a fluid level high signal to pump control system 110, which causes pump 124 to begin pumping fluid out of the reservoir 122 (if it was not already doing so).

Pump control system 110 is the above-ground part of installation 100 and may be located on a wall or other position for easy access by inhabitants of the domicile 102 or maintenance personnel. Pump control system 110 has a housing 202 that is closed and locked against persons other than authorised personnel. The housing 202 has a visual alarm indicator 203 and an audible alarm 204 to indicate to the inhabitants that a fault has occurred or is occurring. A mute button 205 may be located on an external part of the housing 202 and may be actuated in order to silence the audible alarm 204.

Pump control system 110 has a controller 208, a wireless transceiver unit 210, a backup power supply, for example in the form of a battery 215, a relay 224 to control operation of the pump 124 and an electrical supply and control block 240. Pump control system 110 may also have one or more additional wireless or wired transceivers or receivers (not shown). One or more flow meters and/or other instruments (not shown) associated with water, power or other utilities may also form part of system 100 and be in communication with the one or more additional wireless or wired transceivers or receivers. Controller 208 comprises a memory (not shown) and at least one processor (not shown) configured to execute program instructions stored in the memory. Also stored in the memory are a number of set points and control parameters for operation of the pump and the wireless transceiver unit 210.

Controller 208 is enabled for two-way communication via transceiver unit 210 with a remote server 130 over wireless telecommunications infrastructure, for example using a standard GSM mobile telephony protocol. Controller 208 may also be enabled for one- or two-way communication with external devices, such as flow meters or other instruments (not shown), via additional transceiver or receiver units (if present) over a low power wireless communication protocol, for example Bluetooth or IEEE 802.11 protocols, or a wired communication protocol. In this way, the controller and transceivers/receivers may act as a fully or partly wireless hub to allow communication and/or control of multiple local instruments or devices associated with system 100. The transceiver unit 210 has a transmitting and receiving antenna 211 concealed within the housing 202. The housing 202 is formed of a suitable non-conductive material to allow sufficient signal transmission strength out of and in to the housing 202.

Controller 208 stores in its memory measured fluid level data when it changes by a predetermined amount, such as a percentage amount or a number of millimetres, for example. Similarly, other measured parameters or operational statuses are recorded in the controller's memory when they change and time-stamped as of when they occur. This stored data is then uploaded via the transceiver unit 210 to the server 130 periodically, such as every 1, 2, 4, 6, 8, 12 or 24 hours, or on demand from the server 130.

The schematic layout and electrical diagrams are shown in FIGS. 2 and 3 for the pump control system 110. These two drawings should be read in conjunction with each other in order to understand the physical and electrical layout of the components of pump control system 110.

Battery 215 provides a backup power source for the controller 208 and transceiver unit 210 in order to maintain communications capabilities during a loss or substantial drop in power level received from mains power supply 248. A current sensor 221 and voltage sensing relay 241 are coupled to the mains power supply 248 via a mains switch 246 in order to sense the input current and voltage. The current sensor 221 and voltage sensing relay 241 provide their outputs to controller 208 so that the controller 208 can monitor the input power supply level and cease operation of the pump 124, if necessary. The power supply input block 240 also comprises first and second circuit breakers 245a, 245b and a DC power supply transformer 242. A fuse 244 is also provided, in case of spikes in the mains supply. The DC power supply 242 charges the battery 215. A 12 VDC control relay 247 is provided to allow the controller 208 to control the pump relay 224.

The pump relay 224 is operated in response to control signals from controller 208 when a manual switch is in the auto position. When the manual switch 243 is in the off position, the relay 224 is open and the pump 124 does not receive power. When the manual switch 243 is in the manual position, the relay 224 is closed and the pump receives mains power independently of control from the controller 208. The relay 224 provides mains power to the pump 124 via suitable power cables 225 that extend into the ground and into the fluid reservoir 122 in a suitable manner.

Fluid level transducer 112 has its output conductors 213 coupled to a connection block 214 to which the controller 208 is electrically connected. Also coupled to this connection block 214 is the output of the float switch 212, so that the controller 208 receives an on or off status signal from the float switch 212.

Controller 208 may include or be in the form of a serial communication and data acquisition (SCADA) unit, which effectively functions as a programmable logic controller (PLC). The controller 208 has a suitable serial data connection with transceiver unit 210. The controller 208 may be or include a suitable DNP3 SCADA pack 100 controller from Control Microsystems, for example. Other controllers may be used in the system 100 and may employ the DNP3 communications protocol or another suitable communications protocol to perform the functions of controller 208 described herein.

The transceiver unit 210 may be a NetComm NTC-6908 industrial 3G cellular network router, for example. The transceiver unit 210 may thus provide a point-to-point or point-to-multi-point communication capability in order to suitably interface with remote server 130. The transceiver unit 120 may use a suitable domain name system (DNS) capability so that any subscriber identity module (SIM) in the transceiver unit 120 can be interchanged with another such SIM.

The digital and analogue inputs and outputs for the controller 208 are generally as follows:

Controller Binary Inputs:
BI-1: Emergency High Level Float Switch;
BI-2 Site Mains Power Failed Alarm;
BI-3: Pump Run Command State.
Controller Binary Outputs:
BO-1: Pump Inhibit signal from controller 208.
Controller Analogue Inputs:
AI-1: Well Level from level sensor 112;
AI-2: Pump Current;
AI-3: Pump Start Level SP (status);
AI-3: Pump Stop Level SP (status).
Controller Analogue Outputs:
AO-1: Pump Start Level SP (from server 130);
AO-2: Pump Stop Level SP (from server 130).

The operation of the controller 208 may be further characterised in the following terms:

Operation

The pump 124 runs if the sensed level of fluid in the tank 122 is at or above the Pump Start Level set-point and stops if the sensed fluid level in the tank 122 reaches or falls below the Pump Stop Level set-point. The Pump Start Level set-point (AO-1) and the Pump Stop Level set-point (AO-2) are not physical outputs of controller 208—rather, they are both set using a software configuration tool 430 executing on (or served by) the server 130 and accessible to authorised users via a suitable computerised user interface hosted by server 130. The user interface experienced by users of client devices 420, 425 may be provided by a browser application 440 executing on one or more of the client computing devices 420, 425 in system 400, for example. Once selected, the Pump Start Level set-point and the Pump Stop Level set-point are stored in data store 140 and transmitted by server 130 to the transceiver unit 210 and controller 208 of each installation 100 to which the selected set-points apply.

A high level analogue set point may also be included in order to start the pump 124 and set alarms if the sensed fluid level is at a point above a normal start level. If the Float/Emergency High Level signal (BI-1) is active, then the pump 124 will be forced to run until the signal input goes low for a pre-set time (set via the user interface accessible via client computing devices 420, 425). The controller 208 can disable the pump 124 for a set time (default 8 hours).

Controller 208 may be receive and respond to a command from the configuration tool 430 to adjust the Start Level set-point to run the pump 124 between the Start Level set-point and Hi Level set-point until a specified time (in a flush mode), so that a greater-than-normal fluid volume may be flushed from the reservoir 120.

Digital Inputs
Float/Emergency High Level
Power Status OK (from voltage monitor relay)
High Pressure input
Alarm Mute Push Button
Analogue Inputs
Level Probe (4-20 ma)
Pump Amps-CT (4-20 ma)
Digital Outputs
Motor Run (to motor contactor)
Alarm Horn (Horn to auto mute after 5 min)
Alarm Lamp (different flash depending on alarm)
Strobe flasher (on until alarms clear)

SCADA Display (Provided by User Interface on Client Devices 420, 425)
  Pump Runs
  Pump Fails
  Pump Running Current
  Level
  All alarms
  All Set points
  Force off Time set-point
  Alarms (Alarms Clear on PLC Power Cycle—or Condition Cleared)

| Lamp Action | Alarm |
|---|---|
| Lamp double flash | Pump Failure |

If a high current is detected for a set time period, stop the pump for 10 min. If a pump stops 10 times (or another configurable number) in a row, lock out the pump. The pump alarm continues to operate.

| Lamp Action | Alarm |
|---|---|
| Lamp triple flash | Pump High Pressure |

If a high pressure is detected for a set time, stop the pump for 10 min. If a pump stops 10 times in a row, lock out the pump.

| Lamp Action | Alarm |
|---|---|
| Lamp on | Emergency High Level |

On detection of a high float condition tripping the float switch, activate the Lamp/Horn and notify the server 130, which displays the condition via the user interface 430.

Figure 4:
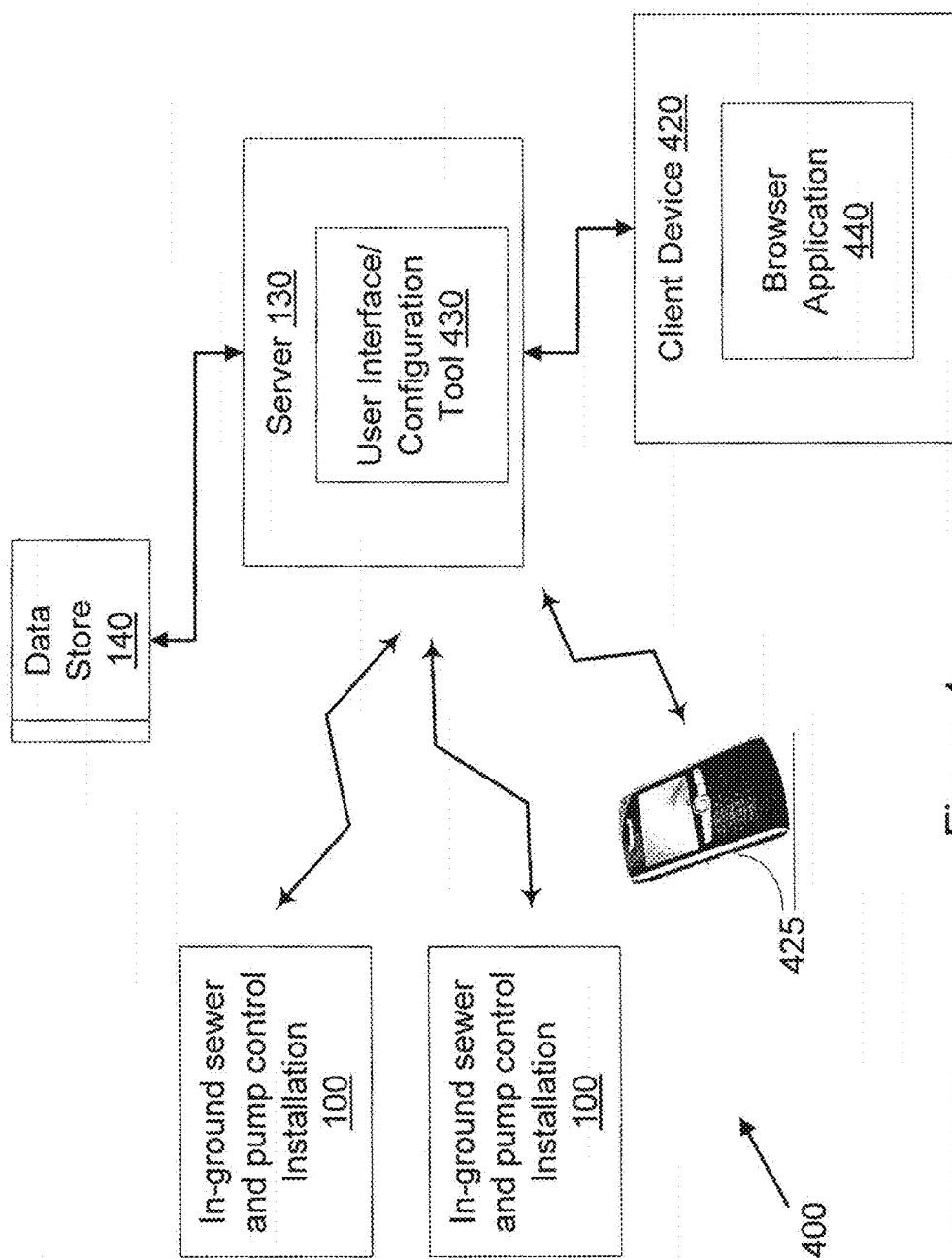
FIG. 4 is a schematic diagram of a pressure sewer network monitoring system according to some embodiments.
Figure 8:
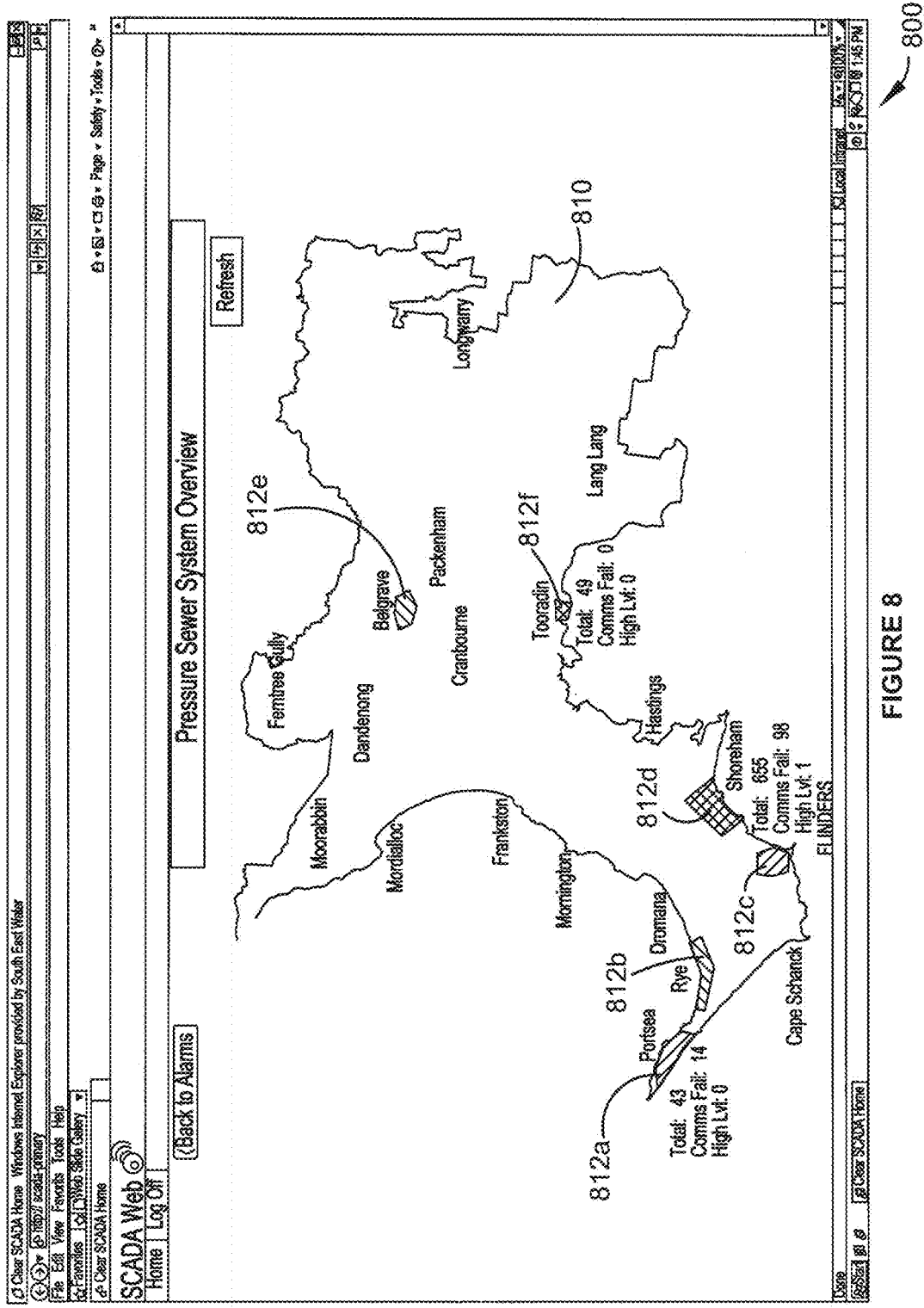
FIG. 8 is a further example user interface display generated by interface components of the pressure sewer network monitoring system.

Generally, the lamp strobe and horn activate after a pre-set time delay from the alarm occurrence and an exception report is sent to the remote server 130 after a separate (shorter) time value. The time difference between the strobe and horn activation and the exception report transmission may be up to 18 hours. This allows remote diagnostics to be run and allows the responsible utility organisation time to assess and rectify the apparent problem before the resident is notified of the problem by activation of the alarm.
  Set Points
  Pump Stop Level
  Pump Start Level
  Pump High Level
  Pump High Amps
  Pump No run/Low Amps
  Pump Run to Long Time
  Pump Emergency High Level Run on timer
  Pump Disable Timer Referring now to FIG. 4, a pressure sewer monitoring system 400 comprising multiple installations 100 is described in further detail. Pressure sewer monitoring system 400 comprises multiple installations 100 located in different geographic locations across one or more sewerage network zones. The multiple installations 100 may be part of a single zone within a larger sewerage network or may be spread across different zones and/or different networks. By way of example only, each zone may have one, two, three, four, five, six, seven, eight, nine, ten or more installations 100 located at different positions within the zone. Further, there may be more than ten, for example between ten and possibly hundreds of such installations 100 within a particular sewerage zone and/or network. By way of example, FIG. 8 illustrates six separate zones (indicated by references 812a, 812b, 812c, 812d, 812e and 812f), located within part of a larger service zone 810 and viewable in relation to a map display 800 on a client device. Each zone 812 has one or more installations 100 located therein.

Fluid monitoring system 400 further comprises one or more servers or server systems, referred to herein for convenience as server 130, at least one wired client device 420 and/or at least one mobile client device 425 and a data store 140. Server 130 is arranged to receive data from installations 100 representative of the sensed conditions of the pump 124 and/or fluid level in the fluid reservoir 122 at various different locations. This data is received over a data network comprising suitable communications infrastructure (not shown) that is at least partially wireless, such as a cellular network. For example, the transceiver units 210 of installations 100 may be configured to transmit data to server 130 using the GSM or GPRS/3G standards for mobile telephony or their technological successors. Alternatively, lower power, shorter distance wireless communication techniques may be employed, for example where a local wireless data hub is in sufficient proximity to support wireless communication with the transceiver unit 210 within a nearby installation 100. In some embodiments, the transceiver unit 210 may act as a local wireless data hub for other devices, such as metering or sensing instruments, in the immediate vicinity of system 100.

Server 130 processes the data received from transceiver units 210 and stores it in data store 140 for subsequent retrieval as needed. Data store 140 may comprise any suitable data store, such as a local, external, distributed or discrete database. If the data received at server 130 from installations 100 indicates an alarm condition in any one or more of installations 100, server 130 accesses data store 140 to determine a pre-determined appropriate action to be taken in relation to the specific alarm condition, and then takes the appropriate action. The action to be taken may vary, depending on the installation 100, for example where some installations 100 may play a more critical monitoring role than others. Such actions may include, for example, sending one or more notifications, for example in the form of text messages and/or emails, to one or more of client devices 420, 425.

Figure 5:
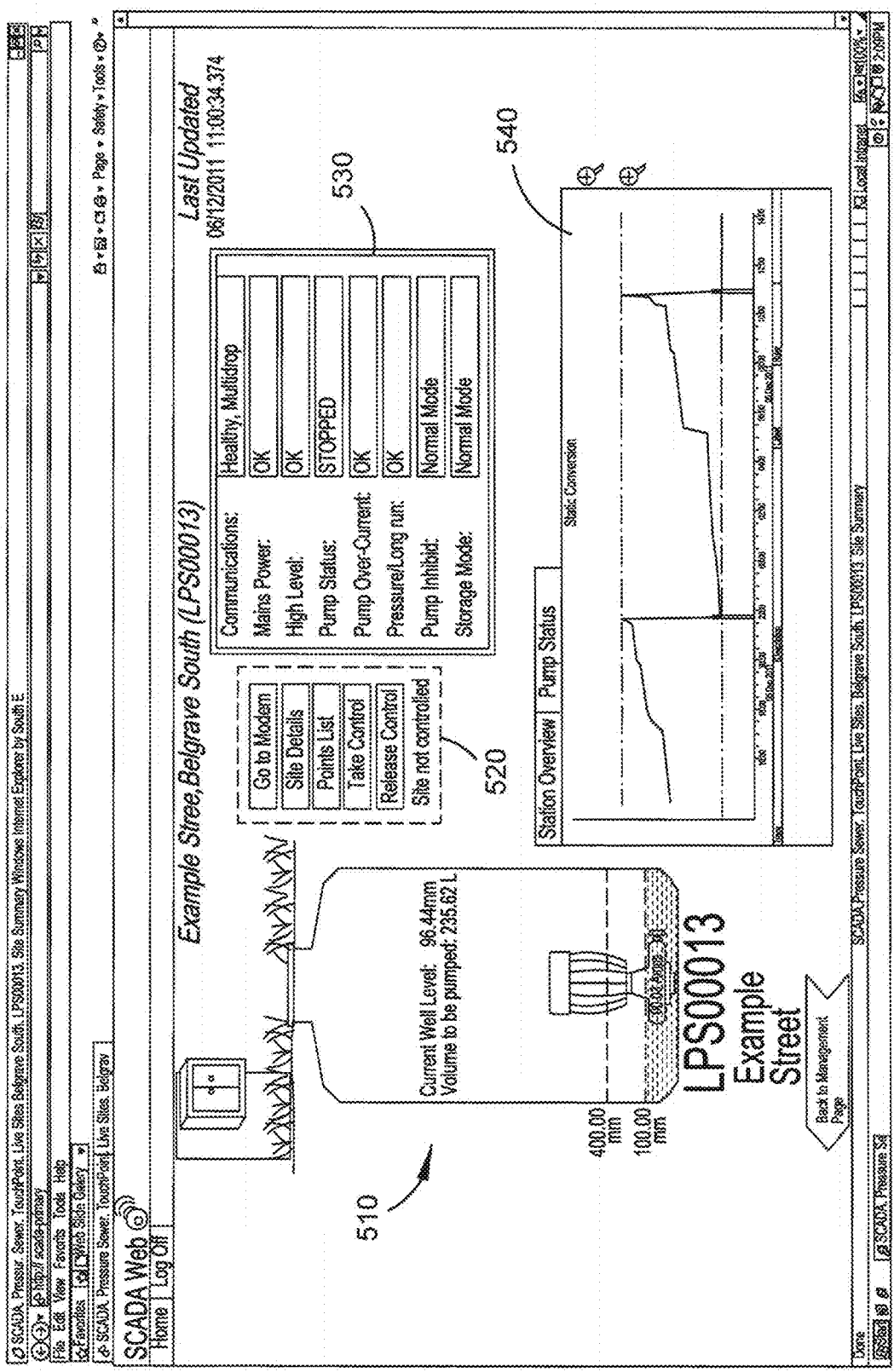
FIG. 5 is an example user interface display generated by interface components of the pressure sewer network monitoring system.
Figure 6:
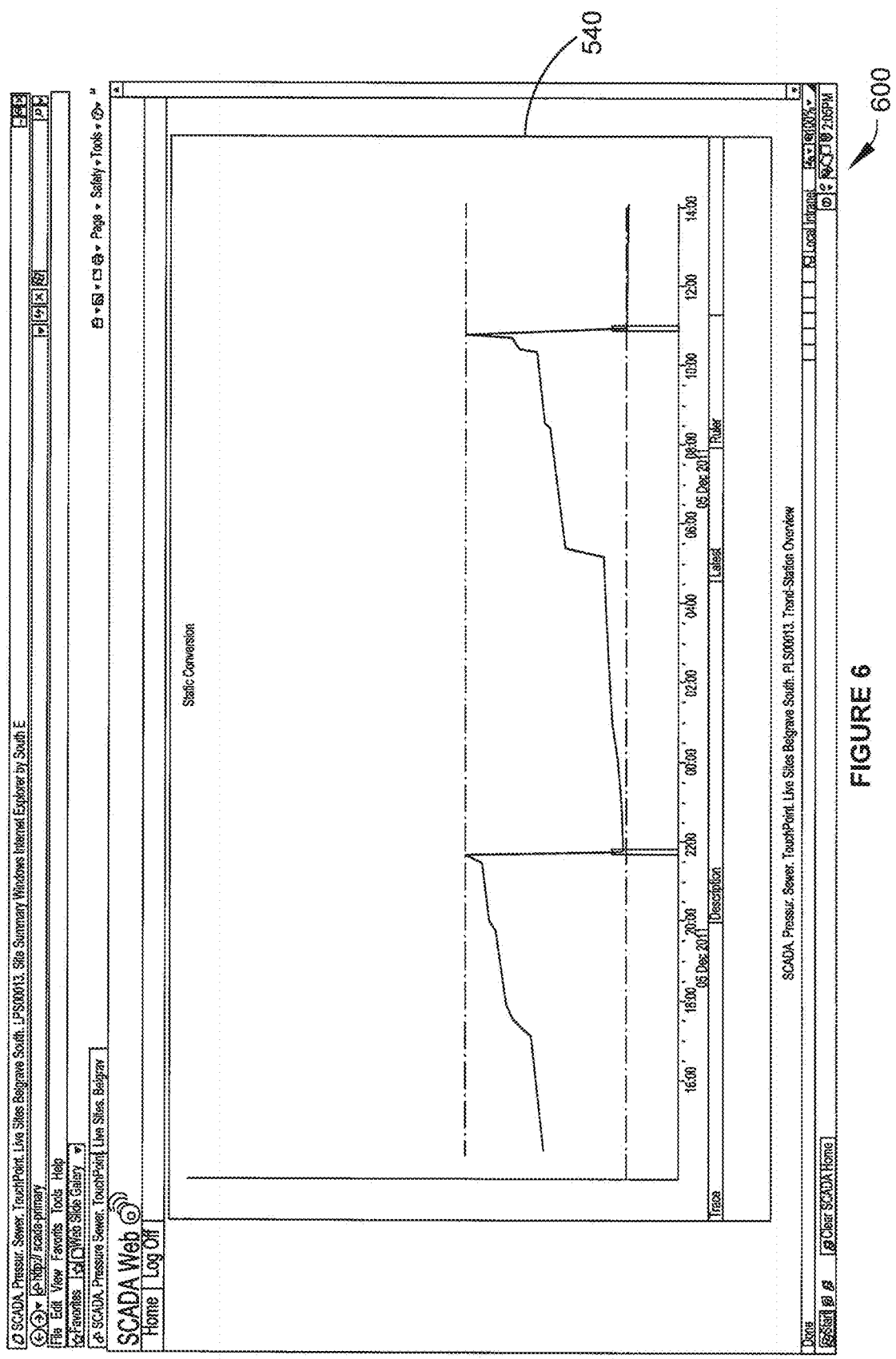
FIG. 6 is an example plot of fluid level in a fluid reservoir of one pressure sewer installation over time.

Regardless of whether an alarm condition is indicated by the data received at server 130 from installations 100, that data is processed and stored in data store 140 for later retrieval by a server process and/or at a request from a client device 420, 425. For example, server 130 may execute processes (based on program code stored in data store 140 or a memory local to the server 130, for example), to perform trending and reporting functions to one or more client devices 420, 425. For example, server 130 may provide to a client device 420 information to enable generation of a display 500, 600, 700 or 800 (FIG. 5, 6, 7 or 8 respectively) via browser application 440 at client device 420 or 425 in response to a request for such information or automatically at regular intervals. Display 500 may chart historical and current data for one or more conditions of operation of the pressure server installations 100 at different locations over a period of time. For example, as shown in FIG. 5, display 500 may include a chart 540 of fluid levels at a particular pressure sewer installation 100 over a period of time, as well as displaying status information 530 for a number of operational parameters of the installation 100.

Server 130 executes a user interface 430 based on locally accessible stored program code to allow users of client devices 420, 425 to access configuration, control, monitoring and reporting functions of server 130 with respect to installations 100. The user interface 430 thus acts as a control and configuration tool accessible to users of client devices 420, 425. The user interface, control and configuration functions of user interface 430 are primarily performed by server 130, but some functions may be executed in part by the browser application 440 on client devices 420, 425 based on code, including applets for example, served to the respective client devices 420, 425 from server 130.

In alternative embodiments, instead of browser application 440, each client device 420, 425 may execute a specialised software application stored in local memory accessible to the processor of the device. This specialised application may perform various user interface functions locally and communicate with the server 130 as necessary. For example, for mobile client computing devices 425, the specialised application may be in the form of a "smart phone" application.

Displays 500, 600, 700 and 800 shown in FIGS. 5, 6, 7 and 8, respectively, may be generated at client device 420, 425 by a suitable software application executing on the client device 420, 425, such as browser application 440 when executed by a processor of the client device 420, 425 according to program code stored in the local storage accessible to that processor.

In preferred embodiments, transceiver unit 120 is enabled for bidirectional communication with server 130, so that new fluid level thresholds can be set, control commands can be issued, firmware updates can be received and/or diagnostic monitoring and testing can be performed remotely.

Pressure sewer monitoring system 400 thus comprises a series of installations 100 located around an area or zone for which operational status is desired to be monitored. These installations 100 communicate with server 130, which in turn communicates with client devices 420, 425 as necessary. Server 130 also tracks and stores historical data received from the installations 100 and processes the incoming and historical data according to rules stored in data store 140 to determine whether certain pre-defined events of interest may be occurring. Such events may be complex events and may be defined in the stored rules as such. In order to optimally manage a particular sewerage zone or zones, for example in flood situations system 400 may control installations 100 to cease normal autonomous operation for a period of time or to operate under a higher level set-point.

In system 400, each installation 100 may be configured to have the same or a similar set of operational parameters (i.e. alarm levels, sensor sampling times, reporting intervals, etc.) and may have the same set of sensors 112, 212 and general configuration.

In some embodiments of system 400, the transceiver unit 210 of each installation may be configured to send a message directly to a mobile communication device of an end user (i.e. client device 420, 425) when an alarm condition is determined by controller 208. This may be instead of or in addition to sending the message to the server 130.

Figure 9A:
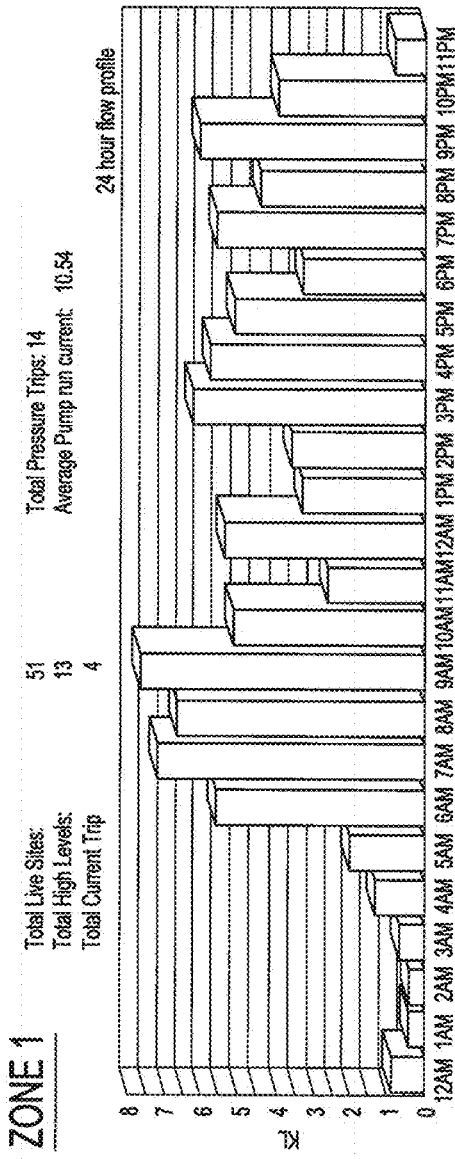
FIGS. 9A and 9B are example reports of measured fluid levels in multiple installations in different zones.
Figure 9B:
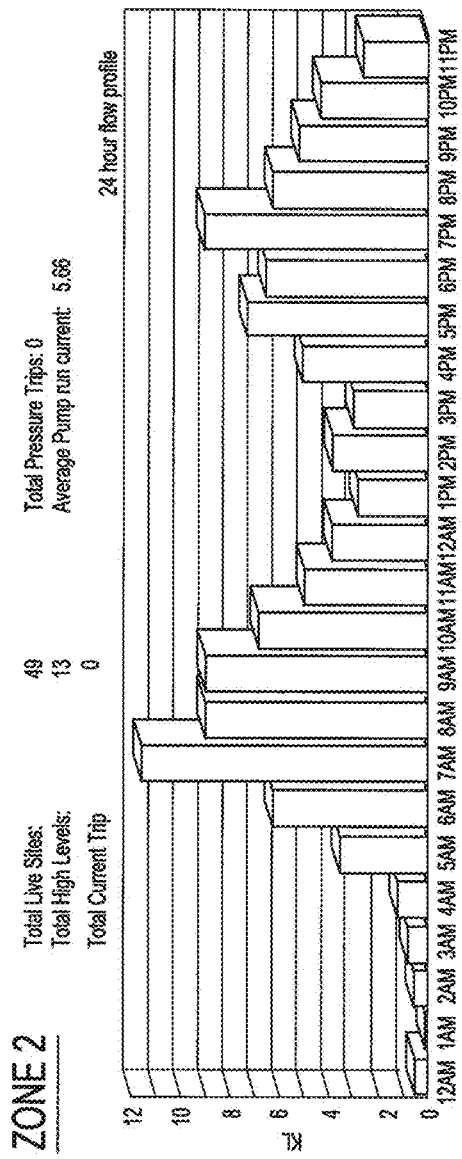

Advantages of the described embodiments over prior pressure sewer systems include a substantially improved remote control and monitoring capability. This is further supported by use of a mobile telephony standard protocol to facilitate point-to-point or point-to-multi-point communication between the server 130 and the controller 208 of each pump control system 110. There are also substantial advantages in providing the level sensor output from each level sensor 112 to the remote server 130 on a regular basis, to allow monitoring and optimised usage of sewage network infrastructure when a number of installations 100 are monitored and controlled separately or together as part of the same pressure sewer system 400. For example, usage histograms, such as those illustrated in FIGS. 9A and 9B can be obtained for different zones.

The described embodiments allow calculation of real time waste fluid volumes, which provides accurate engineering data for planning and design purposes. Described embodiments also allow real time calculated waste fluid flow monitoring, which can be used with remote control of the pumps 124 by commands from server 130 to manage peak flows discharged into sewer mains and treatment facilities. This can more evenly distribute the waste fluid flows over time, which can ease the burden on the processing infrastructure and reduce the risk of breakdown of the infrastructure.

Further advantages associated with described embodiments include the ability to infer the likelihood of leakage from one or more installations 100. For example, for a given installation, 100, the number of level changes during a particular period, such as the time between 2.00 a.m. and 3.00 a.m., together with a measure of the amount of level change over time (such as millimetres per minute) can indicate the likelihood of a leak at the site of the installation 100. A steady rise in the fluid level during that period over a number of days can indicate a small leak. Maintenance personnel can therefore be dispatched to the site to investigate before the leakage becomes a significant problem. The described embodiments therefore allow organisations, such as those responsible for maintenance of the pressure sewer network, to identify and address problems with one or more installations 100 before they develop into a complaint by the inhabitant of the domicile 102.

Referring in particular to FIG. 5, the system 400 comprises capabilities, including suitable software and hardware modules, to execute user interface 430, which allows operational maintenance personnel to monitor and remotely control the operation of each installation 100. Display 500 in FIG. 5 is an example of a user interface display generated by browser application 440 based on program code and/or data served from server 130. Display 500 has a graphical depiction 510 of the fluid reservoir 122 of a particular installation named LPS 00013. Also shown in the graphical representation 510 is the pump 124, together with an indication of the upper fluid level threshold or set-point (for example, 400 mm) at which the pump 124 will be operated in order to pump fluid from the fluid reservoir 122. That upper fluid level threshold may be reconfigured using the user interface 430 and suitable software control actions, for example selected from the control options list 520 presented via browser application 440. Similarly, a lower level threshold, shown in this case as 100 mm, may be the level at which the pump 124 is caused to stop running. The control options list 520 may allow the operational personnel to remotely take control or release control of the pump 124 by issuing commands to the associated controller 208. Further, status information is provided in a status display 530 of the user interface. This status information may be reconfigured where permissible, for example in order to change an operational mode of the pump or change one or more of the set points.

Display 500 in FIG. 5 also has a sub-display 540 of a fluid level plot over time, indicating the increasing fluid level up to the point where it reaches the upper fluid level threshold, after which the pump decreases the fluid level in a short period back down to the minimum (lower level threshold). This plot 540 can also indicate the current drawn by the pump 124 over time, in order to verify that the high current consumption periods of the pump 124 correlate with the decreases in the fluid level due to pump operation. This plot 540 is shown in further (magnified) detail in FIG. 6.

Figure 7:
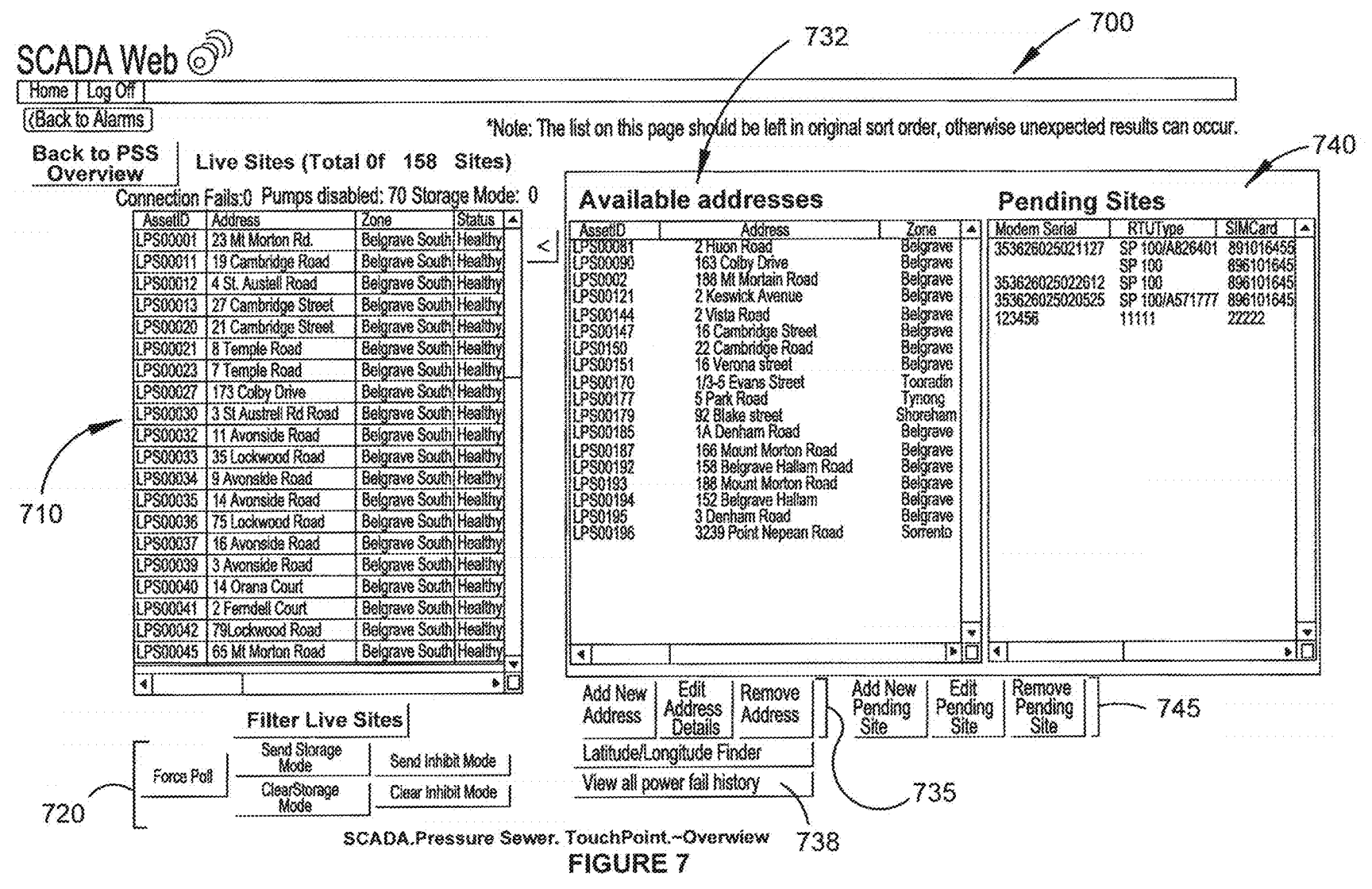

FIG. 7 illustrates a further display 700 of the user interface, including a list 710 of multiple sites of installations 100, from which a particular installation 100 of interest may be selected for further detailed analysis or control. In the user interface illustrated in FIG. 7, certain selectable control functions 720 are illustrated. For example, the operational personnel can force the immediate data polling by server 130 of the controller 208 of a particular installation 100 (rather than wait the normal 24 polling period), in order to have that controller 208 upload all of the recorded data accumulated and stored in its memory since the last upload. Further, selectable options are provided to inhibit operation of the pump 124 or the pump control functions of the controller 208. Further, the user interface (presented via browser application 440) shown in FIG. 7 allows new installations to be added to the live network from a list 732 as they become installed. Additionally, a list 740 of sites at which installation is pending may be provided. Control buttons 735 are provided to allow editing of the list 732 and control buttons 745 are provided to allow editing of the list 740. Further reports and displays may be selectable, such as the ability to view the history of all power failures of the installations 100.

As is evident from the user interface shown in FIG. 7, the server 130 maintains comprehensive data records of each installation 100 in the data store 140, together with historical operational data for each such installation. The length of time of the historical data may be configured depending on how much data storage is available and/or how much historical data is deemed to be useful in accomplishing the necessary monitoring and control functions. The stored historical data may be periodically condensed, as necessary, in order to avoid storing historically irrelevant information.

Embodiments have been described herein by way of example, with reference to various possible features and functions. Such embodiments are intended to be illustrative rather than restrictive. It should be understood that embodiments include various combinations and sub-combinations of features described herein, even if such features are not explicitly described in such a combination or sub-combination.

The invention claimed is:

1. A pressure sewer network monitoring and control system, comprising:
a remote server in communication with at least one pump control system provided at a respective at least one pressure sewer installation comprising at least one fluid reservoir,
wherein the remote server is configured to:
monitor operation of the at least one pressure sewer installation based on messages received from the at least one pump control system;
determine a changed fluid level threshold for the at least one fluid reservoir of the at least one pump control system based on the messages, wherein the messages comprise information indicative of a measured fluid level in the at least one fluid reservoir of the respective at least one pressure sewer installation; and
remotely control operation of the at least one pump control system by transmitting one or more commands to the at least one pump control system, wherein at least one of the one or more commands comprises the changed fluid level threshold and is effective to cause a controller of the at least one pump control system to store the changed fluid level threshold in a memory of the at least one pump control system.

2. The system of claim 1, wherein the remote server is in communication with at least one wireless transceiver of the at least one pump control system.

3. The system of claim 1, further comprising a computerised user interface in communication with the remote server to allow remote user control of the at least one pump control system.

4. The system of claim 1, wherein the remote server is configured to determine an alarm condition based on the messages received from the at least one pump control system and to automatically transmit one or more alarm messages to one or more user recipients, the one or more alarm messages including an indication of the alarm condition.

5. The system of claim 1, wherein the messages further comprise information indicative of a sensed condition of a pump associated with the at least one pump control system.

6. The system of claim 1, wherein the changed fluid level threshold is associated with a period of time.

7. The system of claim 1, wherein the remote server is configured to store historical operational data for each of the at least one pressure sewer installations in a data store.

8. The system of claim 1, wherein the remote server is configured to process the messages and historical operational data associated with the at least one pressure sewer installation according to rules stored in a data store to determine whether pre-defined events of interest may be occurring.

9. The system of claim 1, wherein the remote server is configured to process the messages received from the at least one pump control system to perform trend analysis or to pre-emptively diagnose problems with one or more pressure sewer installations.

10. The system of claim 1, wherein the remote server is configured to determine a presence of a leak at a pressure sewer installation in response to determining from the messages that a rate of change of fluid level in the at least one fluid reservoir exceeds a leakage threshold value.

11. The system of claim 1, wherein the one or more commands comprise instructions to set operational parameter values for at least one of fluid level thresholds, alarm levels, sensor sampling levels and reporting intervals.

12. The system of claim 1, wherein the one or more commands comprise instructions to inhibit at least one of operations of a pump of the at least one pump control system and pump control functions of a controller of the at least one pump control system.

13. The system of claim 1, wherein the remote server is configured to transmit the one or more commands to the at least one pump control system to cause the at least one pump control system to cease normal autonomous operation for a period of time in response to the remote server determining that a flood situation may be occurring at the at least one pressure sewer installation.

14. The system of claim 1, wherein the remote server is configured to transmit one or more commands to the at least one pump control system to cause the at least one pump control system to operate under a relatively higher level set-point in response to the remote server determining that a flood situation may be occurring at the at least one pressure sewer installations.

15. The system of claim 1, wherein the remote server is configured to determine commands for another pump control system of a respective pressure sewer installation in a region based on additional messages received from the at least one pump control system of the at least one respective pressure sewer installation provided in the region to optimise usage of sewage network infrastructure within the region.

16. The system of claim 1, wherein the remote server is configured to calculate real time waste fluid volumes based on the messages received from the at least one pump control system to determine data for engineering, planning or design purposes.

17. The system of claim 1, wherein each of the at least one pump control systems corresponds to a respective pressure sewer installation within a region, and the remote server is configured to process additional messages received from a plurality of the at least one pump control systems to calculate real time waste fluid flows in sewage network infrastructure within the region and to manage peak flows in the sewage network infrastructure by determining the commands for the pump control systems of the respective pressure sewer installations based on the real time calculated waste fluid flows.

18. A method of monitoring and controlling operation of a pressure sewer network, the method operable in a remote server in communication with at least one pump control system provided at a respective at least one pressure sewer installation comprising at least one fluid reservoir, the method comprising:
receiving messages from the at least one pump control system over a communications network;
monitoring operation of the at least one pressure sewer installation based on the messages;
determining a changed fluid level threshold for the at least one fluid reservoir of the at least one pump control system based on the messages, wherein the messages comprise information indicative of a measured fluid level in the at least one fluid reservoir of the respective at least one pressure sewer installation; and
remotely controlling operation of the at least one pump control system by transmitting one or more commands to the at least one pump control system, wherein at least one of the one or more commands comprises the changed fluid level threshold and is effective to cause a controller of the at least one pump control system to store the changed fluid level threshold in a memory of the at least one pump control system.

19. The method of claim 18, wherein the remote server is in communication with a wireless transceiver of the at least one pump control system, and wherein the communications network comprises a wireless communications network.

20. The method of claim 18, wherein the changed fluid level threshold is associated with a time period.

21. The method of claim 18, further comprising processing the messages and historical operational data associated with the respective at least one pressure sewer installation according to rules stored in a data store to determine whether pre-defined events of interest may be occurring.

22. The method of claim 18, further comprising processing the messages received from the at least one pump control system to perform trend analysis or pre-emptively diagnose problems with the at least one respective pressure sewer installation.

23. The method of claim 21, comprising determining a presence of a leak at the at least one pressure sewer installation in response to determining from messages received from the at least one pump control system of the respective at least one pressure sewer installation that a rate of change of fluid level in the at least one fluid reservoir exceeds a leakage threshold value.

24. The method of claim 18, wherein transmitting one or more commands comprises transmitting one or more commands to the at least one pump control system to cause the at least one pump control system to cease normal autonomous operation for a period of time in response to the server determining that a flood situation may be occurring at the at least one pressure sewer installations.

25. The method of claim 18, wherein transmitting one or more commands comprises transmitting one or more commands to the at least one pump control system to cause the at least one pump control system to operate at a relatively higher start level set-point in response to the remote server determining that a flood situation may be occurring at the at least one pressure sewer installations.

26. The method of claim 18, wherein transmitting one or more commands comprises transmitting one or more commands to the at least one pump control system to cause the at least one pump control system to operate at a relatively higher start level set-point for a specified period of time.

27. The method of claim 26, further comprising transmitting commands to the at least one pump control systems to cause the at least one pump control system to operate to pump fluid out of the at least one fluid reservoir once the specified period of time has elapsed.

28. The method of claim 18, further comprising processing messages received from a plurality of the at least one pump control systems of the respective at least one pressure sewer installations within a region to calculate real time waste fluid flows in sewage network infrastructure within the region and determining the commands for a plurality of at least one pump control systems of the respective at least one pressure sewer installations within the region based on the real time calculated waste fluid flows to manage peak flows in the sewage network infrastructure.

* * * * *